Patented May 6, 1930

1,757,661

UNITED STATES PATENT OFFICE

JAMES W. FRASER, OF CLEVELAND, OHIO

ASPHALTIC CONCRETE PAVING

No Drawing. Application filed January 24, 1927. Serial No. 163,313.

My invention relates to the composition and mixture of paving material, particularly to the production of an improved material for asphaltic concrete pavements.

In the production of such pavements the standard specifications for many years have called for an asphaltic cement of various degrees of penetration. This penetration generally was controlled by the use of a definitely specified flux.

Generally speaking an asphalt cement comprises two groups of hydro-carbons and their percentage in asphalitc cement is roughly determined by the use of various solvents.

The lighter group is called the malthenes. This group gives the asphalt cement its sticky qualities and it is with this group that my invention is particularly identified. Certain writers on asphalt paving claim that natural malthas is not suitable even for flux and that Kentucky sand rock asphalt of this group is not suitable for a satisfactory pavement. Further, that the bitumen contained in said sand is semi-asphaltic but too soft for use as a paving cement.

By experiment I have discovered that after the removal of the bitumen contained therein said Kentucky sand rock asphalt shows a peculiarly sharp angular fracture. It is this peculiarity, in combination with the sticky bitumen with which it is impregnated, that gives to said Kentucky sand rock asphalt the quality of resisting the tendency to slide, push, or flow under pressure from traffic, as well as to give it the property of being spread and consolidated into a hard surface when cold. A test of said Kentucky sand rock asphalt when compared with the general asphalt cement shows it to be lower in fixed carbon and higher in malthenes.

My said invention consists in producing a pavement in which a higher degree of stability is secured and one which, on account of its constituent parts, also will be self-healing and very durable.

This I accomplish in the following manner: I take eight parts of clean crushed stone and heat the same to 250° Fahrenheit. To this I add two parts of Kentucky sand rock asphalt and mix. The hot stone softens the Kentucky sand rock asphalt to a degree that enables the mixture to become a homogeneous mass. During the mixing the Kentucky sand rock asphalt absorbs the heat from the stone and reduces its temperature to a degree that prevents any loss of the volatile elements of the bitumen. To this mixture I add one part (by volume) of asphalt cement of a penetration suitable for the particular job for which the mixture is to be used.

The resulting mixture is more stable than asphaltic concrete produced by the usual methods and this result follows partly on account of the peculiar shape of the sand grains, which, as above stated, are of a peculiarly sharp angular fracture adapting them to engage with the other parts of the mixture in a manner to resist tendency to flow, or slide, and separate to form fissures, or breaks, in the pavement. It also is self-healing because of the tendency of the component parts of the mixture to hang together on account of the peculiar adhesive qualities of the bitumen found in the Kentucky sand rock asphalt as well as because of the sharp angular surfaces of the sand particles which afford peculiar tying and packing qualities.

Having thus fully described my said invention, what I claim as new and desire to secure by Letters Patent, is:

The method of making a paving mixture which consists in heating crushed stone to approximately 250 degrees Fahrenheit and mixing therewith two parts of cold "Kentucky" sand rock asphalt and then adding to and mixing therewith one part of asphalt cement, substantially as set forth.

In witness whereof, I have hereunto set my hand at Cleveland, Ohio, this 31st day of December, A. D. nineteen hundred and twenty-six.

JAS. W. FRASER.